US006421584B1

(12) United States Patent
Norberg et al.

(10) Patent No.: US 6,421,584 B1
(45) Date of Patent: Jul. 16, 2002

(54) INDEPENDENT COUNTING UNIT

(75) Inventors: John Eric Norberg, Stilwell, KS (US); Ronald A. Leonard, Peculiar, MO (US); Lawrence E. Guerra, Roeland Park, KS (US); Timothy Surgeon, Archie, MO (US)

(73) Assignee: Scriptpro LLC, Mission, KS (US)

( * ) Notice: Subject to any disclaimer, the term of this patent is extended or adjusted under 35 U.S.C. 154(b) by 0 days.

(21) Appl. No.: 09/514,600

(22) Filed: Feb. 28, 2000

Related U.S. Application Data

(60) Provisional application No. 60/123,528, filed on Mar. 2, 1999.

(51) Int. Cl.[7] ................................................ G06F 17/00

(52) U.S. Cl. ........................ 700/242; 700/214; 700/241; 700/242; 221/9; 221/13; 221/123; 53/500

(58) Field of Search ................................ 700/214, 241; 705/2; 53/500; 198/502; 414/277, 281, 332; 221/9, 13, 123, 124, 126, 129, 133, 236

(56) References Cited

U.S. PATENT DOCUMENTS

| | | | | | |
|---|---|---|---|---|---|
| 1,128,561 | A | | 2/1915 | Webendorfer | |
| 2,690,856 | A | | 10/1954 | Trondle | |
| 3,746,211 | A | | 7/1973 | Burgess, Jr. | |
| 4,284,301 | A | | 8/1981 | Geiger et al. | |
| 4,660,824 | A | | 4/1987 | Hermkens et al. | |
| 4,753,473 | A | | 6/1988 | Arnett | |
| 4,810,230 | A | | 3/1989 | Shirasawa | |
| 4,869,394 | A | * | 9/1989 | Hurst | 221/7 |
| 4,872,803 | A | | 10/1989 | Asakawa | |
| 4,902,263 | A | | 2/1990 | Ito et al. | |
| 5,082,268 | A | | 1/1992 | Santoro | |
| 5,208,762 | A | * | 5/1993 | Charhut et al. | 53/54 |
| 5,332,275 | A | | 7/1994 | Conway et al. | |
| 5,337,919 | A | | 8/1994 | Spaulding et al. | |
| 5,463,829 | A | * | 8/1994 | Strange et al. | |
| 5,562,383 | A | * | 10/1996 | Iwai et al. | 414/217 |
| 5,671,592 | A | * | 9/1997 | Yuyama et al. | 53/493 |
| 5,713,487 | A | | 2/1998 | Coughlin | |
| 5,762,235 | A | | 6/1998 | Coughlin | |
| 5,798,020 | A | | 8/1998 | Coughlin et al. | |
| 5,838,575 | A | * | 11/1998 | Lion | 364/479.01 |
| 5,860,563 | A | | 1/1999 | Guerra et al. | |
| 5,873,488 | A | | 2/1999 | Guerra | |
| 5,884,806 | A | * | 3/1999 | Boyer et al. | 221/75 |
| 5,897,024 | A | | 4/1999 | Coughlin et al. | |
| 6,006,946 | A | * | 12/1999 | Williams et al. | 221/9 |
| 6,161,721 | A | * | 12/2000 | Kudera et al. | 221/9 |

FOREIGN PATENT DOCUMENTS

| | | |
|---|---|---|
| JP | 53145260 | 12/1978 |
| JP | 5943743 A | 10/1984 |
| SD | SU918086 | 4/1982 |

* cited by examiner

*Primary Examiner*—Christopher P. Ellis
*Assistant Examiner*—Jeffrey A. Shapiro

(57) ABSTRACT

An automatic medicament dispensing machine (10) that does not remain idle while medicaments are transferred to a vial and counted and that therefore dispenses medicaments at a much faster rate. The machine includes a cabinet (12); a plurality of medicament dispensing cells (14) arranged in the cabinet for holding and dispensing medicaments; a plurality of medicament counting units (18) each including a vial gripper for holding a vial and a transfer mechanism for transferring medicaments from one of the medicament dispensing cells to the vial; and a transporter (20) for transporting the counting units to the cells for filling the vials held by the counting units.

13 Claims, 7 Drawing Sheets

INDEPENDENT COUNTING UNIT

RELATED APPLICATION

This application claims the priority benefit of provisional application entitled Independent Counting Unit, Serial No. 60/123,528, filed Mar. 2, 1999, incorporated into the present application by reference. The application also relates to U.S. Pat. Nos. 5,337,919, 5,897,024, 5,860,563, 5,798,020, and 5,873,488, all incorporated by reference.

BACKGROUND OF THE INVENTION

1. Field of the Invention

The present invention relates to automatic medicament dispensing machines. More particularly, the invention relates to a medicament dispensing machine having a plurality of independent medicament counting units.

2. Description of the Prior Art

Automatic medicament dispensing machines such as the one disclosed in U.S. Pat. No. 5,337,919 (the '919 patent) more quickly and accurately dispense medicaments such as prescription drugs. The machine disclosed in the '919 patent includes a cabinet, a plurality of medicament dispensing cells positioned in the cabinet for holding and dispensing medicaments, and a transporter/manipulator mechanism that moves in the enclosure for positioning a vial adjacent a selected one of the medicament dispensing cells for receipt of medicament therefrom. Once a vial has been filled, the transporter/manipulator places the filled vial on a conveyor for labeling and subsequent inspection by a pharmacist or other operator.

While the automatic medicament dispensing machine disclosed in the '919 patent dramatically increases the accuracy and speed at which medicaments are dispensed, its overall speed or throughput is limited by the time required to transfer medicaments from a cell to a vial. This is because the transporter/manipulator includes both the mechanism that transfers medicaments from a cell to a vial and the mechanism that counts the medicaments as they are being transferred. Therefore, the transporter cannot be used to transport other vials to a dispensing cell until a first vial has been filled and transported out of the machine, but instead must remain idle during medicament transfer and counting. Because medicaments must be transferred from a dispensing cell to a vial somewhat slowly to ensure an accurate count, this idle time can be a significant percentage of the total time required to dispense a filled vial of medicaments.

OBJECTS AND SUMMARY OF THE INVENTION

The present invention solves the above-described problems and provides a distinct advance in the art of automatic medicament dispensing machines. More particularly, the invention provides an automatic medicament dispensing machine that does not have to remain idle while medicaments are transferred to a vial and counted and that therefore can dispense medicaments at a much faster rate.

The automatic medicament dispensing machine of the present invention broadly includes a cabinet; a plurality of medicament dispensing cells arranged in the cabinet for holding and dispensing medicaments; a plurality of medicament counting units; and a transporter for transporting the counting units to the cells for filling vials held by the counting units. In accordance with one important aspect of the invention, each counting unit includes a vial gripper for holding a vial and a transfer mechanism for transferring medicaments from one of the medicament dispensing cells to the vial The transporter and counting units are configured so that the transporter can: (1) couple with and transport a first counting unit to one of the dispensing cells and then detach from the first counting unit to permit it to fill its vial with medicaments from the dispensing cell; and then (2) couple with and transport second and subsequent counting units to other dispensing cells for filling their vials with medicaments. Because each counting unit includes mechanisms for transferring and counting medicaments from a cell to a vial, the transporter does not have to perform these functions. This permits the transporter to pick up and transport counting units and their vials to dispensing cells while previously placed counting units fill their vials with medicaments. Then, when the counting units are finished filling their vials with medicaments, the transporter can individually remove the counting units from their cells and transport the filled vials out of the machine.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
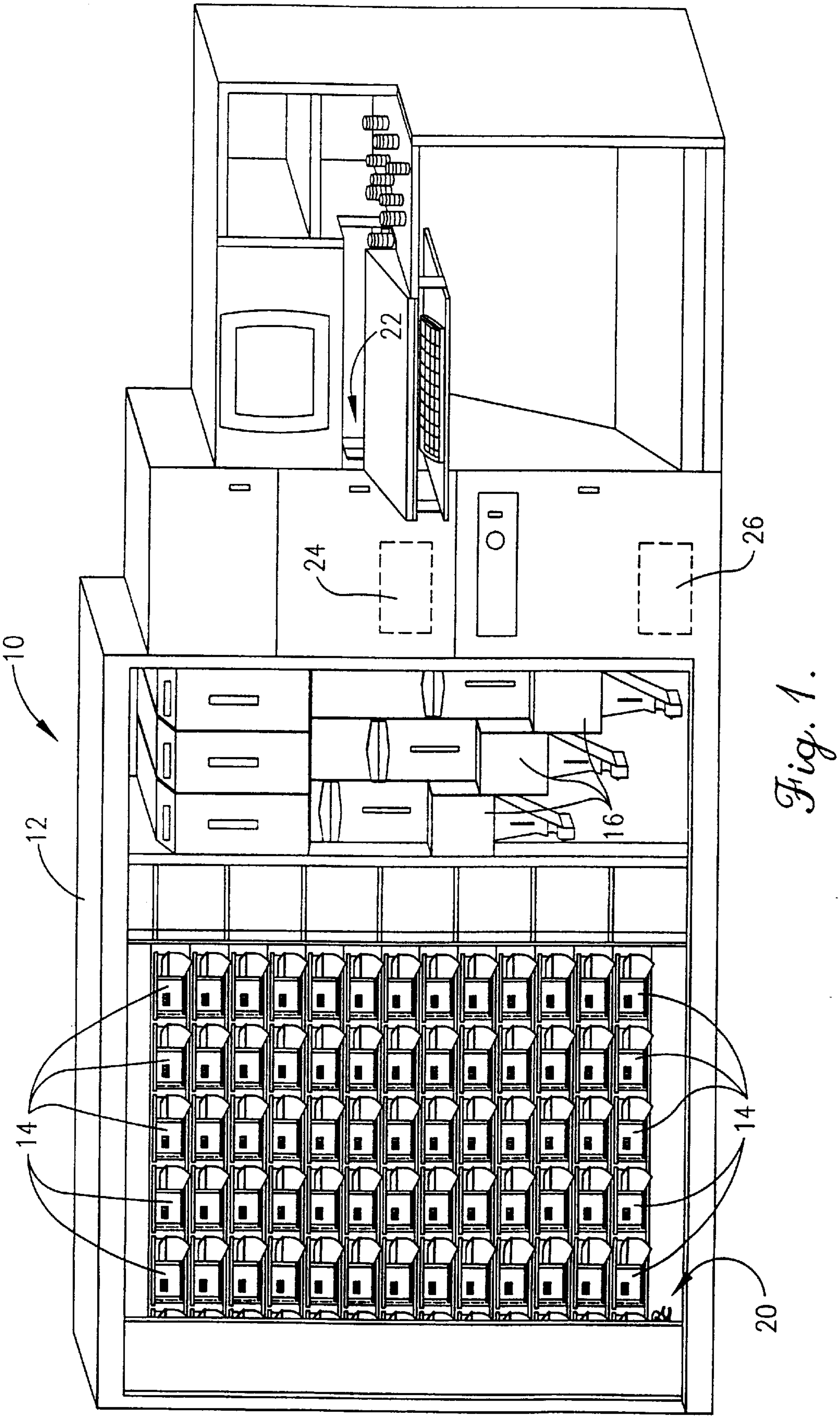
FIG. 1 is an isometric view generally depicting an automatic medicament dispensing machine constructed in accordance with a preferred embodiment of the present invention.
Figure 2:
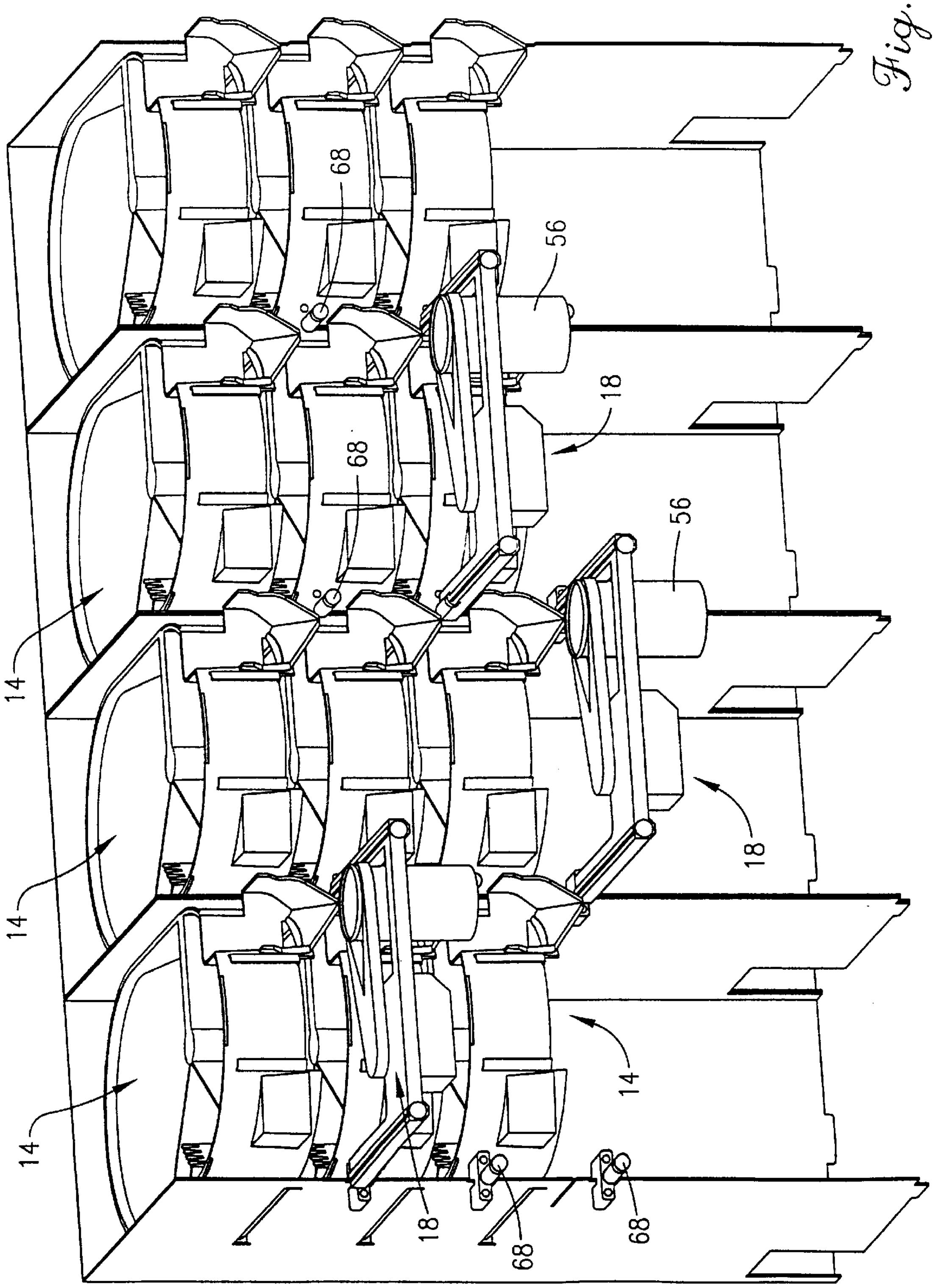
FIG. 2 is an isometric view illustrating a plurality of medicament dispensing cells and independent medicament counting units of the automatic medicament dispensing machine of FIG. 1.

Turning now to the drawing figures, and particularly FIGS. 1 and 2, an automatic medicament dispensing machine 10 (hereinafter referred to in Detailed Description as "machine") constructed in accordance with a preferred embodiment of the invention is illustrated. The machine broadly includes a cabinet 12, a plurality of medicament dispensing cells 14 (hereinafter referred to in Detailed Description as "dispensing cells") positioned in the cabinet, at least one vial dispenser 16, a plurality of independent medicament counting units 18 (hereinafter referred to in Detailed Description as "counting units"), a transporter assembly 20, a discharge conveyor 22, a labeler 24, and a control computer 26.

Figure 7:
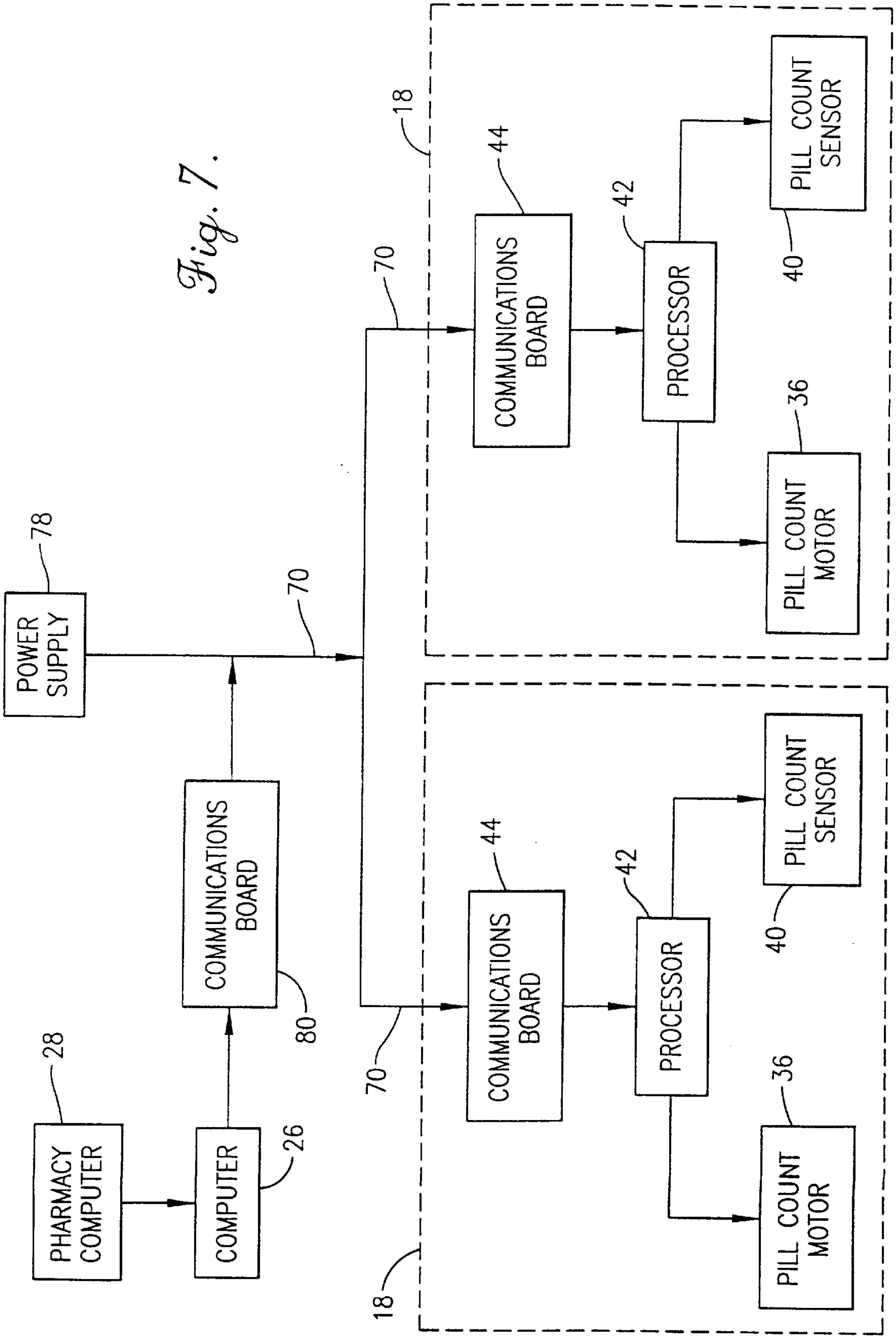
FIG. 7 is a schematic diagram of certain power and control components of the automatic medicament dispensing machine.
Figure 8:
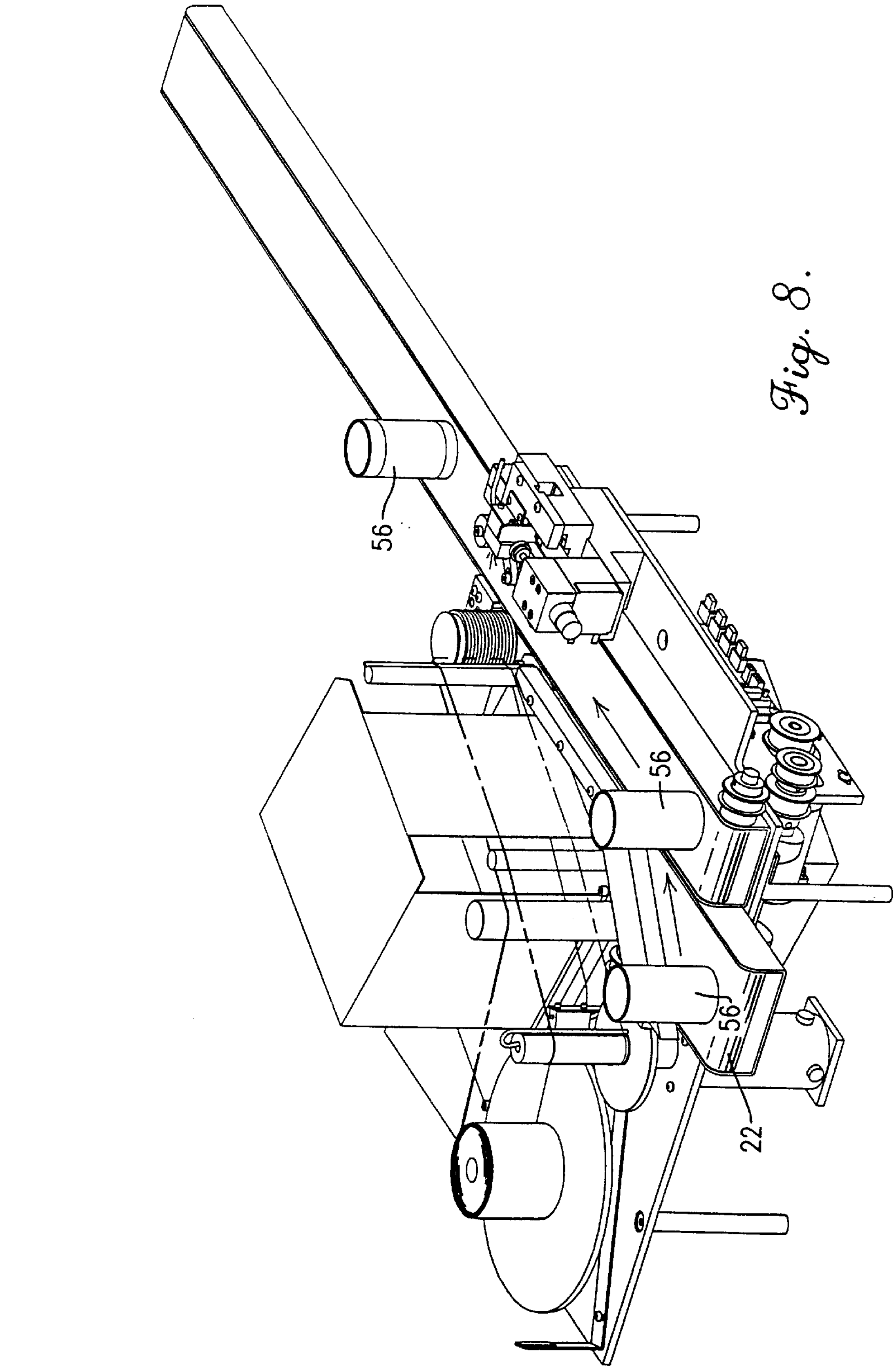
FIG. 8 is an isometric view illustrating a discharge conveyor within a vial labeler apparatus of the automatic medicament dispensing machine.
Figure 9:
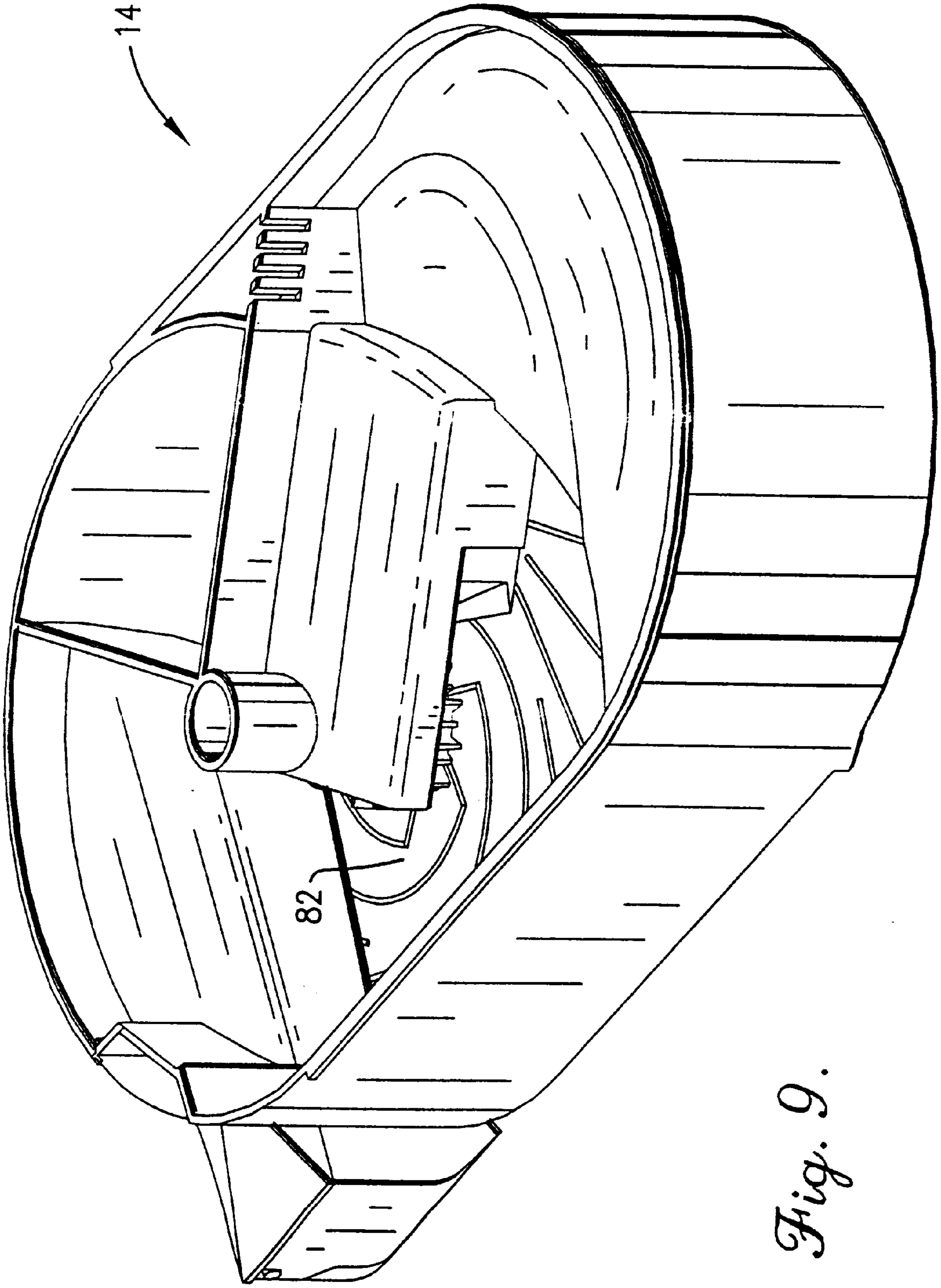
FIG. 9 is an isometric view illustrating one of the medicament dispensing cells of the automatic medicament dispensing machine.

The general operation of the machine 10 is as follows. The computer 26 receives requests to dispense medicaments from a pharmacy computer 28 (FIG. 7). The computer 26 responds by instructing the transporter 20 to couple with a first one of the counting units 18 and transport it to one of the vial dispensers 16 to retrieve an empty vial therefrom. The transporter then transports the first counting unit and its vial to a dispensing cell that contains the requested medicaments and attaches the counting unit adjacent the dispensing cell. The first counting unit then transfers medicaments from the dispensing cell to its empty vial while the transporter detaches from the first counting unit and finds a second, idle counting unit. The transporter then transports the second counting unit to a vial dispenser to pick up a vial and then to the dispensing cell that contains other requested medicaments. The second counting unit then fills its vial with medicaments. These operations may then be repeated for subsequent counting units. When one of the counting units has completed a filling operation, it notifies the computer, which directs the transporter to retrieve the counting unit from its respective dispensing cell. The transporter then transports the counting unit and its filled vial to the discharge conveyor and places the filled vial on the conveyor for labeling and subsequent inspection by a pharmacist or other operator of the machine.

The components of the machine 10, except for the counting units 18, the transporter 20, and the programming of the computer 26, are substantially identical to the components found in the SP 200 machine manufactured and sold by ScriptPro LLC of Mission, Kans., except as disclosed herein. The overall operation of the SP 200 machine is described in more detail in U.S. Pat. No. 5,337,919 (the '919 patent), hereby incorporated into the present application by reference. The preferred dispensing cells 14 are described in more detail in U.S. Pat. No. 5,897,024 (the '024 patent), hereby incorporated into the present application by reference. The preferred vial dispensers 16 are disclosed in more detail in U.S. Pat. No. 5,860,563 (the '563 patent), hereby incorporated into the present application by reference. The preferred labeler 24 is disclosed in more detail in U.S. Pat. No. 5,798,020 (the '020 patent), hereby incorporated into the present application by reference. Certain portions of the counting units 18 are described in U.S. Pat. No. 5,873,488 (the '488 patent), hereby incorporated into the present application by reference.

Figure 3:
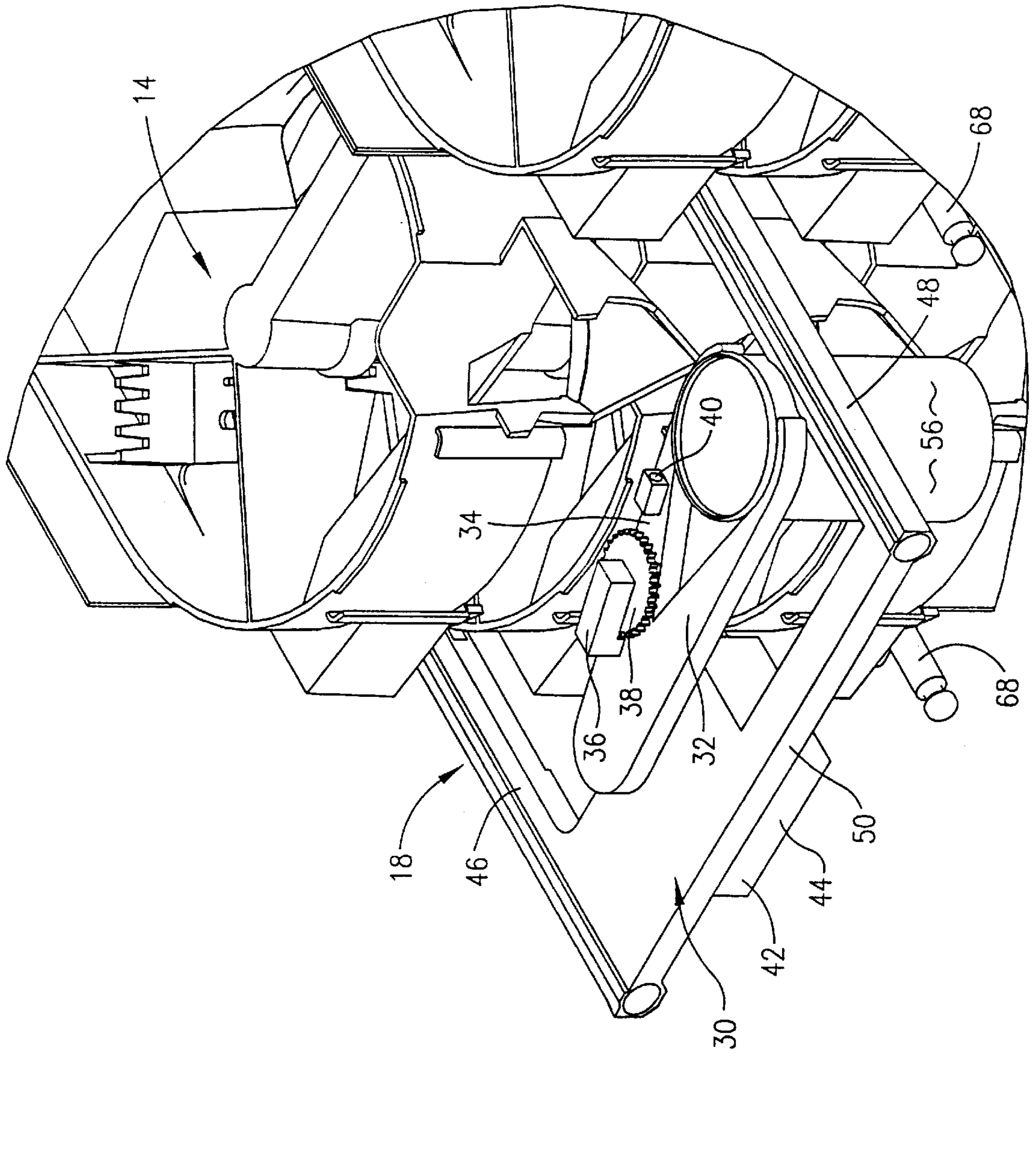
FIG. 3 is an isometric view illustrating one of the medicament dispensing cells and one of the independent medicament counting units in more detail.

The machine 10 may include any number of counting units 18; however, initial calculations show that 3–5 units are optimal. As best illustrated in FIG. 3, each counting unit 18 broadly includes a frame 30, a pair of vial-gripping jaws 32, 34, a pill count motor 36 and gear 38, a pill count sensor 40, a microprocessor 42, and a spread spectrum communications board 44. Each counting unit is preferably assigned a unique identification code used for tracking and identification purposes. The codes may be bar coded or otherwise printed on the counting units.

Figure 4:
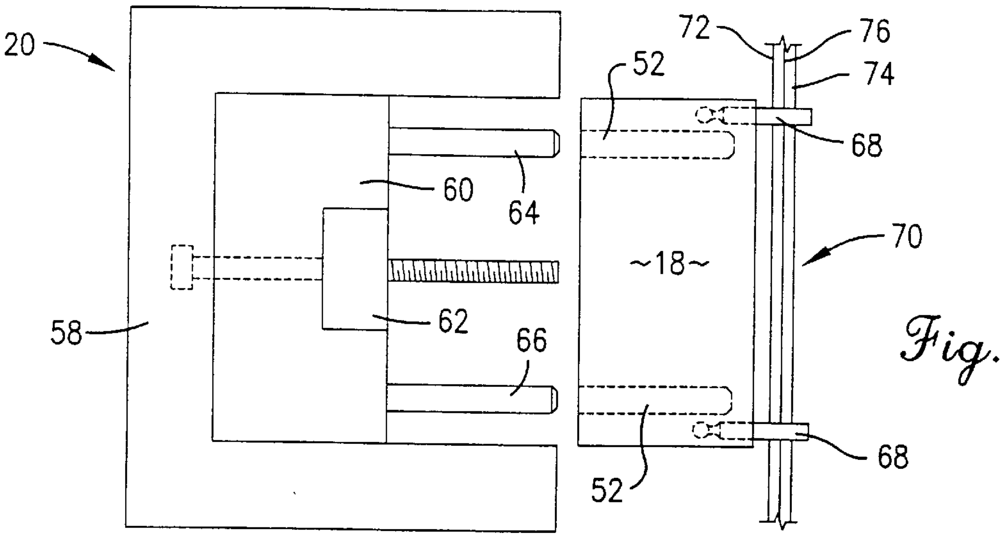
FIG. 4 is a schematic plan view of a portion of the transporter and one of the medicament counting units showing the medicament counting unit in its operational, counting position.
Figure 5:
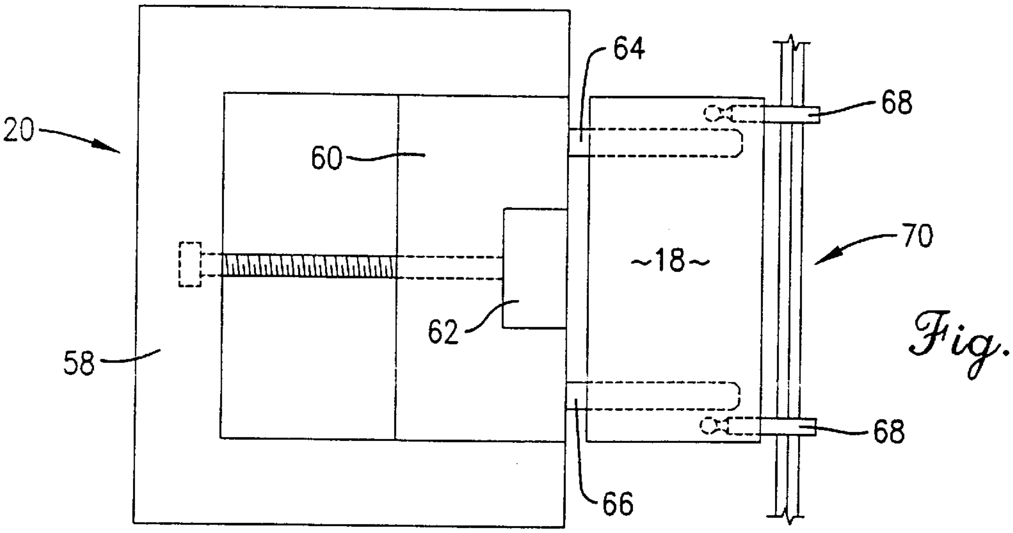
FIG. 5 is a schematic plan view of a portion of the transporter and one of the medicament counting units showing the medicament counting unit immediately before it is removed from its operating, counting position.
Figure 6:
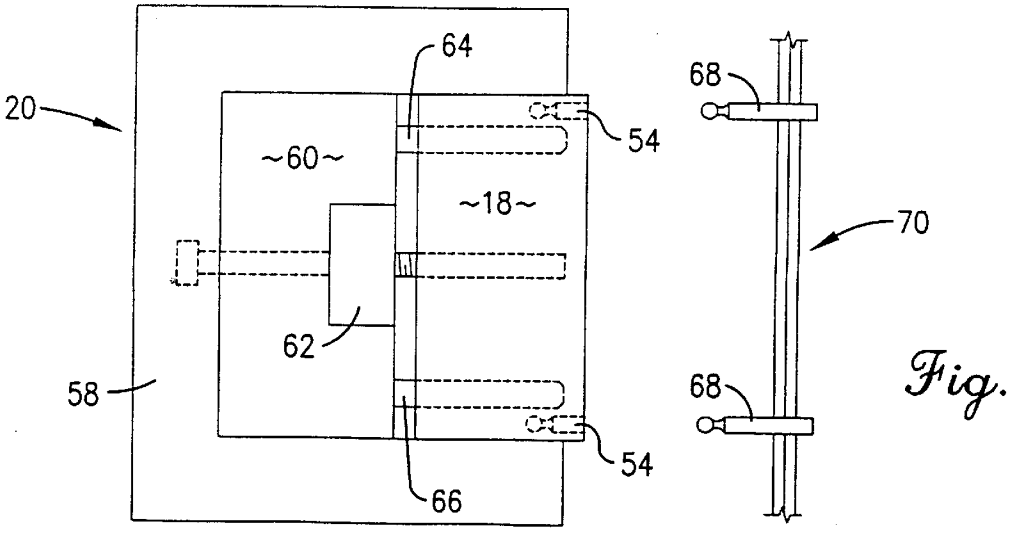
FIG. 6 is a schematic plan view of a portion of the transporter and one of the medicament counting units showing the medicament counting unit in its transport position.

The frame 30 is generally U-shaped and includes a pair of spaced-apart legs 46, 48 connected by an intermediate bight section 50. As best depicted in FIGS. 4–6, each leg includes a post-receiving socket 52 and a knob-receiving socket 54 formed therein, the purposes of which are described in more detail below.

The jaws 32, 34 are pivotally mounted to the frame 30 and are configured to releasably grip a vial 56 therebetween so that the vial may be filled with medicaments from one of the dispensing cells 14 and then deposited on the discharge conveyor 22 for labeling and subsequent inspection. The jaw 32 is driven by a jaw motor positioned on the transporter 20. The driven jaw pivots on a shaft and is driven between opened and closed positions by a jaw motor on the transporter. The driven jaw is coupled with spring that pulls it to its closed or vial-gripping position and rests against a dead stop at its fully-open position. A switch indicating when the driven jaw is in it fully-open position is mounted to the transporter. The other jaw 34 is not driven by a motor, has a fixed amount of travel, and comes to rest against a dead stop in each direction at the end of its travel. The non-driven jaw is coupled with a switch that indicates when it is in each of its end positions and is attached to a light spring that pushes it away from its home stop position.

The pill count motor 36 and gear 38 are preferably mounted to the non-driven jaw 34 and are provided for rotating the platens on the dispensing cells 14. The motor and gear are operated by the microprocessor and are structurally described in more detail in the '488 patent referenced above. The pill count sensor 40 is also preferably mounted on the non-driven jaw and is coupled with the microprocessor. The sensor is preferably the same type of sensor described in the '488 patent referenced above.

In accordance with one important aspect of the present invention, the microprocessors 42 and communications boards 44 on the counting units 18 enable the counting units to communicate directly with the computer 26 for receiving medicament dispensing instructions therefrom. The microprocessor may be any type of computing device such as the Motorola 6833X family of processors. The communications board may be any commercially-available chip set that enables spread spectrum communications between the microprocessor and the computer via a power bus. The microprocessor and communication board are preferably coupled to one another via a serial data link. The microprocessor is also preferably coupled with the pill count motor 36 and the pill count sensor 40.

The transporter 20 is similar to the transporter/manipulator described in the patents and the SP 200 medicament dispensing machine referenced above, except that it is modified to include mechanism that permits it to releasably couple with any one of the counting units 18. Specifically, as best illustrated in FIGS. 4–6, the transporter includes a generally U-shaped frame 58 and a moveable carriage 60 coupled with the frame by a linear actuator 62. The carriage includes a pair of mounting posts 64, 66 extending therefrom that can be inserted into the corresponding post-receiving sockets 52 in the counting units so that the transporter can pick up and transport a counting unit.

Specifically, when the transporter 20 has moved its frame 58 adjacent a counting unit 18, the linear actuator 62 may shift the carriage 60 to its extended position so that the mounting posts 64,66 are received within the post-receiving sockets 52 on the counting unit as illustrated in FIG. 5. The linear actuator may then retract the carriage and the counting unit as depicted in FIG. 6 so that it may transport the counting unit to a vial dispenser or to the outfeed conveyor, depending upon the status of the counting unit. The transporter and the counting units are preferably equipped with clamps to ensure that the counting units are not dropped during transport or while they are mounted adjacent a dispensing cell 14. The clamps are biased to a locking or clamping state when no power is delivered thereto to ensure that the counting units are not dropped during power failures.

When the counting units 18 are not being transported by the transporter 20, they are typically mounted adjacent the dispensing cells 14. To accommodate this, the interior walls of the cabinet include a plurality of attachment knobs 68 extending therefrom on which the corresponding knob sockets 54 on the counting units are received as depicted in FIGS. 4–6. In preferred forms, the dispensing cells are horizontally spaced apart so that a pair of dedicated attachment knobs are provided for each cell. This permits two counting units to be mounted to two horizontally adjacent cells at the same time. In an alternative embodiment illustrated in FIGS. 2 and 3, the knobs are located so that horizontally adjacent dispensing cells share an attachment knob. In this embodiment, two counting units cannot be mounted to two horizontally adjacent dispensing units at the same time.

In addition to securing the counting units 18 adjacent the dispensing cells 14, the attachment knobs 68 provide power and communications to the counting units. To this end, the attachment knobs are coupled with a grid of bus bars 70 extending along the walls of the cabinet. The bus bars each include a pair of split conductors 72, 74 separated by an insulator 76. As illustrated in FIG. 7, the bus bars are coupled with a source of DC power 78 and a communications board 80 coupled with the computer 26. The communications boards 44 on the counting units 18 and the communications board 80 coupled with the computer 26 permit the computer to communicate with the microprocessors 42 on the counting units utilizing conventional spread spectrum communication techniques.

The communication between the computer 26 and a counting unit 18 preferably involves a simple request/response process where either side may initiate a communication. For data flowing from the computer to a counting unit, the request is preferably generated in a C++ application running on the computer. The request is qued to a serial port buffer so that a serial port on the computer may transmit individual bytes of data to its communications board 80. The communications board 80 collects and forwards the packets of information onto the bus 70 via a spread spectrum signal at approximately one kilobyte per second. The attachment knobs 68 extending from the cabinet walls conduct the spread spectrum signal to the communications boards 44 of all counting units attached thereto. The communications board of the counting unit to which a signal is directed decodes the signal and sends the signal to its processor for controlling the pill count motor and pill count sensor as described in more detail below. Data flow from the counting unit microprocessors back to the computer is simply a reversal of the same process.

The counting units 18 and the computer 26 may also communicate by other conventional means. For example, communication may be accomplished through wireless or infrared communication techniques so that no physical contacts between the counting units and the enclosure are required. In this embodiment, power may be supplied to the counting units via battery packs.

OPERATION

When the machine 10 is first powered, each counting unit 18 broadcasts a wake-up message to the computer 26 over the power bus 70. The wake-up message may consist of the serial number of the counting unit, the current location of the counting unit in the enclosure, and the status of the counting unit (e.g., whether it contains an empty or filled vial or has been previously instructed to fill a vial). Each counting unit continues to broadcast its wake-up message until the computer responds.

The computer 26 also sends a signal to the transporter 20 to initiate a calibration procedure each time the machine 10 is first powered. The calibration procedure locates the transporter in the cabinet and provides other information necessary to begin dispensing medicaments from the cabinet.

Dispensing of medicaments from the machine 10 begins when the computer 26 receives medicament dispensing instructions from the pharmacy computer 28. In response, the computer directs the transporter 20 to pickup an available counting unit 18 and transport it to a vial dispenser 16 to retrieve and grip an empty vial. The transporter then transports the counting unit and its empty vial to one of the dispensing cells 14 as depicted in FIG. 6 and scans the bar code on the dispensing cell to verify that the correct dispensing cell has been located. The transporter then mounts the counting unit to the dispensing cell as depicted in FIG. 5 and detaches itself from the counting unit as depicted in FIG. 4.

The computer 26 then broadcasts dispensing instructions to the counting unit 18 over the power bus via its communications board 80. The communications board 44 of the counting unit to which the communications is directed decodes the dispensing instructions and sends the instructions to its processor 42.

The processor interprets the instructions and directs the pill count motor 36 and gear 38 to rotate the platen 82 on the dispensing cell to begin transferring medicaments from the dispensing cell to its vial. The pill count sensor 40 counts the medicaments as they drop into the vial and provides a count signal to the processor. The processor monitors the count signal and turns off the motor when the appropriate number of medicaments are deposited in the vial.

The processor 42 of each counting unit 18 stores data, such as the number of pills required, optimal vial size, and dispensing control parameters such as speed and pill size information so that the machine 10 will not overfill a vial but will proceed to fill a second vial, etc. Also, this data must be stored on a "persistent" basis so that the data is not lost if the machine or the pharmacy computer 28 has to be restarted.

Once a counting unit 18 has completed a vial-filling operation, its microprocessor broadcasts a message back to the computer 26. The computer then instructs the transporter 20 to pick up the counting unit and its filled vial when the transporter is available as depicted in FIGS. 4–6.

The transporter then carries the counting unit and the filled vial to the discharge conveyor 22 and labeler 24 for vial labeling and subsequent inspection by a pharmacist or other operator of the medicament dispensing machine. A counting unit may also broadcast error messages to the computer if, for example, one of its components or a dispensing cell malfunctions.

Importantly, while one counting unit 18 is filling its vial, the transporter 20 is free to pick up another counting unit and to transport it to a vial dispenser 16 and then to a dispensing cell 14. This is because the counting units are each operable to independently transfer and count medicaments from one of the dispensing cells. Thus, the transporter does not have to remain idle during medicament transferring and counting, improving the overall throughput of the machine.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An automatic medicament dispensing machine comprising:

a cabinet;

a plurality of medicament dispensing cells arranged in the cabinet for holding and dispensing medicaments;

a plurality of medicament counting units each including a vial gripper for holding a vial, and a transfer mechanism for transferring medicaments from one of the medicament dispensing cells to the vial; and a transporter for transporting the medicament counting units within the enclosure to the medicament dispensing cells, the transporter and the medicament counting units being configured to permit the transporter to couple with a first one of the medicament counting units, transport the first medicament counting unit to one of the medicament dispensing cells to permit the first medicament counting unit to fill its vial with medicaments from the medicament dispensing cell, detach from the first medicament counting unit, and then couple with a second one of the medicament counting units to transport the second medicament counting unit to another one of the medicament dispensing cells for filling its vial with medicaments.

2. The dispensing machine as set forth in claim 1, each of the medicament counting units further including a medicament counter for counting the number of medicaments transferred from one of the medicament dispensing cells to the vial held by the medicament counting unit.

3. The dispensing machine as set forth in the claim 1, further including a computer that controls operation of the transporter, each of the medicament counting units further including a processor for communicating with the computer for controlling operation of the transfer mechanism in response thereto.

4. The dispensing machine as set forth in claim 1, the medicament dispensing cells each including a rotatable platen on which medicaments are held, the transfer mechanism including a motor and gear for driving the rotatable platen of one of the medicament dispensing cells to transfer medicaments from the platen to the vial held by one of the medicament counting units.

5. The dispensing machine as set forth in claim 1, further including a plurality of attachment knobs connected to the cabinet for mounting the medicament counting units adjacent the medicament dispensing cells while medicaments are being transferred from the medicament dispensing cells to the vials held by the medicament counting units.

6. The dispensing machine as set forth in claim 5, further including a communications and power bus attached to the cabinet and coupled with the computer, a source of power, and the attachment knobs for providing communications and power to the medicament counting units via the attachment knobs when the medicament counting units are mounted adjacent the medicament dispensing cells.

7. An independent medicament counting unit configured for use with an automatic medicament dispensing machine having a plurality of medicament dispensing cells for holding and dispensing medicaments and a transporter, the independent medicament counting unit comprising:

a vial gripper for holding a vial;

a detachable coupling mechanism for coupling with the transporter so the transporter can transport the independent medicament counting unit to one of the medicament dispensing cells and to then detach from the independent medicament counting unit; and a transfer mechanism for transferring medicaments from the medicament dispensing cell to the vial.

8. The independent medicament counting unit as set forth in claim 7, further including a medicament counter for counting the number of medicaments transferred from one of the medicament dispensing cells to the vial held by the medicament counting unit.

9. The independent medicament counting unit as set forth in claim 7, the automatic medicament dispensing machine further including a computer that controls operation of transporter, the independent medicament counting unit further including a processor for communicating with the computer for controlling operation of the transfer mechanism in response thereto.

10. The independent medicament counting unit as set forth in claim 7, the medicament dispensing cells each including a rotatable platen on which medicaments are held, the transfer mechanism including a motor and gear for driving the rotatable platen of one of the medicament dispensing cells to transfer medicaments from the platen to the vial held by the medicament counting units.

11. A method of dispensing medicaments comprising the steps of:

storing medicaments in a plurality of medicament dispensing cells arranged in a cabinet;

transporting a first medicament counting unit and a vial to a first medicament dispensing cell with a transporter;

attaching the first medicament counting unit adjacent the first medicament dispensing cell so that the first medicament counting unit may transfer medicaments from the first medicament dispensing cell to the vial;

detaching the transporter from the first medicament counting unit; and transporting a second medicament counting unit to a second medicament dispensing cell with the transporter while the first medicament counting unit is transferring medicaments from the first medicament dispensing cell.

12. The method as set forth in claim 11, further including the step of retrieving the first medicament counting unit from the first medicament dispensing cell with the transporter once the first medicament counting unit has filled its vial with medicaments from the first medicament dispensing cell, transporting the first medicament counting unit to a conveyor, transferring the vial from the medicament counting unit to the conveyor, applying a label to the vial while it is on the conveyor, inspecting the vial and label, and dispensing the vial to a patient.

13. The method as set forth in claim 11, the first and second medicament counting units each including a vial gripper for holding a vial, a detachable coupling mechanism for coupling with the transporter so the transporter can transport the independent medicament counting unit to one of the medicament dispensing cells and to then detach from the independent medicament counting unit, and a transfer mechanism for transferring medicaments from the medicament dispensing cell to the vial.

* * * * *